Nov. 22, 1927. 1,650,244
C. SUNDSTROM ET AL
PROCESS FOR PRODUCTION OF HYDRATED SODIUM CARBONATE
Filed Oct. 7, 1926
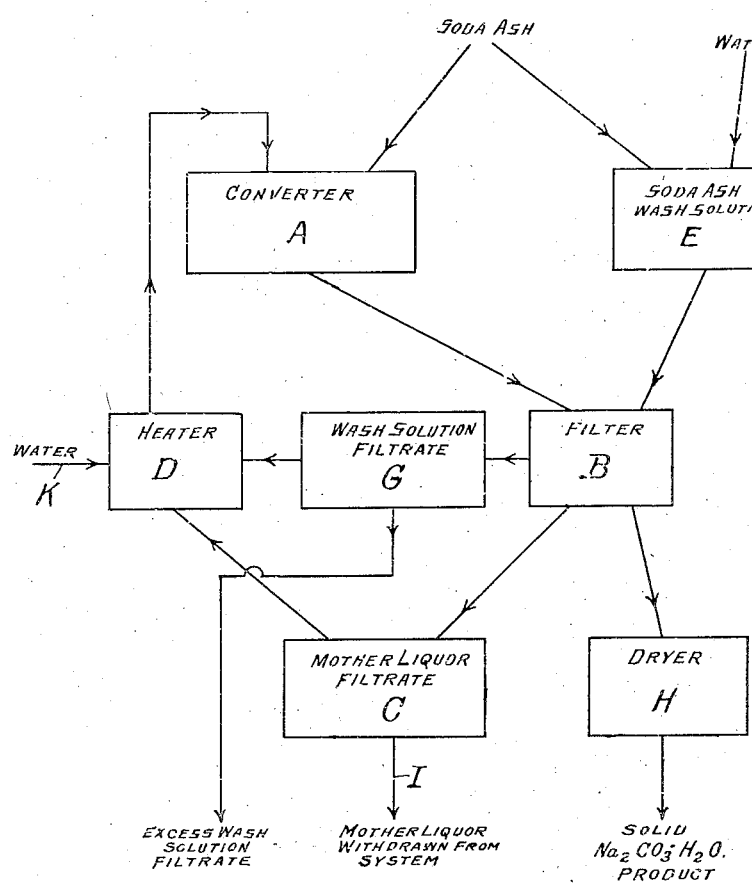
WITNESS
G. V. Rasmussen
INVENTORS
CARL SUNDSTROM
GEORGE N. TERZIEV
BY
Biesen & Schrenk
ATTORNEYS Patented Nov. 22, 1927.

1,650,244

UNITED STATES PATENT OFFICE.

CARL SUNDSTROM AND GEORGE N. TERZIEV, OF SYRACUSE, NEW YORK, ASSIGNORS TO THE SOLVAY PROCESS COMPANY, OF SOLVAY, NEW YORK, A CORPORATION OF NEW YORK.

PROCESS FOR PRODUCTION OF HYDRATED SODIUM CARBONATE.

Application filed October 7, 1926. Serial No. 140,050.

The invention relates to the production of hydrated sodium carbonate and more particularly to the production of the monohydrate, which may be represented by the formula $Na_2CO_3.H_2O$. The object of the invention is to provide a method of producing hydrated sodium carbonate from the anhydrous variety, in a continuous manner, without involving evaporation or large heat consumption at a commercially useful rate and in particles which as to form and size are satisfactory for recovery, for example, by filtration and for sale to the trade, being also relatively free from the impurities usually associated with the original anhydrous material.

Generally speaking, two methods have heretofore been employed for the manufacture of the monohydrate of sodium carbonate. In one method, commercial soda ash, which is anhydrous sodium carbonate, is mixed with somewhat more than the theoretical amount of water. The water combines with the anhydrous salt and the heat of reaction is sufficient to drive off the excess water, so that a solid granular product consisting chiefly of the monohydrate is obtained. In the second method a hot concentrated solution of sodium carbonate is first prepared and the monohydrate is obtained by crystallization from the solution, either by evaporation or by evaporation and cooling, the temperature being maintained above a temperature below which a more hydrated variety such as the decahydrate $Na_2CO_3.10H_2O$ crystallizes out. A usual temperature condition is above 50° C. It is evident that the product of the first method will not be in the form of well defined crystals, and will contain the same and all the impurities of the soda ash raw material which, for example, ordinarily contains some salt. It is also evident that the second process requires considerable apparatus and time for the successive steps of dissolving the soda ash to form a hot concentrated solution, allowing it to be evaporated, crystallizing and filtering, and that considerable heat will be required for the large volumes of liquor dealt with in the commercial operation.

The object of the present invention is the development of a third method which has advantages over both of these older methods.

According to the new method, anhydrous sodium carbonate may be converted directly and rapidly into a solid monohydrate of sodium carbonate in particles of satisfactory size without the use of costly evaporation, crystallization, or the like, and this method furthermore contemplates a process which effects substantial economies in operation, causes the transformation of sodium carbonate into the monohydrate at a commercial rate and produces a marketable product of substantial purity. In the operation of the new process a pool, preferably relatively large, of aqueous liquor is established and that pool is thereafter maintained in a saturated condition with respect to the monohydrate to be produced and at such a temperature (35° C. and upwards, for example) within the temperature range of stability of the monohydrate that when anhydrous raw material is added a corresponding amount of carbonate in the form of monohydrate will be precipitated. The process when conducted in this manner proceeds at a commercially satisfactory rate and a product is recoverable, substantially equivalent in amount to the added raw material, in a relatively pure condition and in particles which in form and size are satisfactory for separation by filtration and for sale to the trade. The pool acts as a vehicle for carrying the materials in suspension and solution, and as a converter for selectively transforming the raw material into a substantially pure monohydrate product, while at the same time it also supplies the water which is necessary for the formation of the monohydrate from the anhydrous sodium carbonate.

In the foregoing manner sodium carbonate monohydrate may be made from ordinary soda ash of commerce, which is one of the cheapest and one of the most readily available sources of raw material, and at the same time obtained in a very pure condition separated from impurities associated with the soda ash raw material, these impurities being dissolved by and remaining in the mother liquor or reaction liquor in which the solid monohydrate product is formed. This is a material advantage over the old method first above mentioned, the product of which will obviously contain the same and all the impurities of the soda ash. As distinguished from the second method mentioned heretofore, the process of this invention does not require the large apparatus and heat and time consuming operations of that method.

The invention will be more particularly described with reference to the accompanying diagrammatic flow sheet of one example of a method of operation in accordance with our invention, wherein sodium carbonate monohydrate is produced from a soda ash such as obtained in the ammonia soda process. In the drawing the letter A designates a converter or reaction vessel (crystallizer or precipitator), provided with any agitator or mixing device of well known type and containing a solution saturated, at above 35° C. and preferably at about 60° C., with respect to the monohydrate, i. e., monohydrate will not dissolve therein. Soda ash is gradually and continuously introduced into the maintained pool of mother liquor contained in A. Solid monohydrate is gradually and continuously precipitated. The rate of introduction of the soda ash is preferably regulated to correspond uniformly with the rate of precipitation of the equivalent amount of monohydrate. The temperature of the solution in A is maintained at a slightly elevated temperature, for example, above 35° C. and preferably at about 60° C. The hydration reaction produces heat so that very little external heat is required to maintain a temperature of the aforesaid value. Liquor containing the formed solid monohydrate in suspension is withdrawn from the reaction vessel A to a filter B, where the mother liquor is separated from the monohydrate precipitate. The filtrate or mother liquor is conducted to and collected in storage vessel C, whereas the monohydrate precipitate, after washing preferably with a solution of soda ash from E, is then transferred to the dryer H. After the precipitate is dried in H, it is a finished product ready for commerce. Of course, if the monohydrate is to be subsequently used in some operation where a dry material is not necessary, the dryer H may be omitted. The mother liquor contained in the system being still saturated with respect to monohydrate, may serve as a liquid vehicle within which the desired reactions occur. Hence, the liquor in C, after reheating to about 60° C. in heater D, is returned to the reaction vessel A for re-use. A continuous cyclic operation is thus set up through the system represented by A, B, C, D, with introduction of the raw material at A and withdrawal of product at B, the liquid vehicle acting as the reaction medium and carrying the precipitated product in suspension.

As stated hereinbefore, impurities in the raw material, particularly sodium chloride and sodium sulfate, are dissolved in and therefore gradually increase in amount in the mother liquor so that ultimately the mother liquor adhering to the monohydrate product would contain such an amount of these impurities that they could not be removed satisfactorily by washing in the filter. In order to prevent this condition, portions of the mother liquor are withdrawn periodically or continuously, for example, from C at I so that impure mother liquor is purged from the system. This, of course, decreases the volume of the liquor in the system, which as well as the water used in the formation of the monohydrate, requires replacement or replenishment. These losses, as well as all other incidental losses such as that due to water adhering to the filtered product, etc., are conveniently replaced by liquor from G, the storage vessel for the wash liquor from the filter washing. The sodium carbonate of this wash liquor is thereby not lost, but is ultimately converted into monohydrate product. Additional water, if required, may of course be introduced into the system say at K, either as water or soda ash solution, or alternatively all the make-up water may be so introduced. In a specific example it was found that the process may be satisfactorily conducted in such a manner that 96% of the soda ash introduced into the system may be recovered as monohydrate in the dried finished product from H, while about 4% is withdrawn, mainly in the mother liquor at I. Of course, if a monohydrate product of a less degree of purity is satisfactory, it may not be necessary to purge mother liquor from the system and in such case the amount of replacement of replenishing liquor or water will be less.

While the process has been described in terms of a continuous operation, it is obvious that each and every step in the operation need not be continuous. For example, the addition of soda ash, the return of mother liquor to A, and the withdrawal of liquor from A might take place consecutively, or two steps in the operation might take place together, followed by a third, or two of them might progress continuously and a third intermittently. In any case, however, it is preferred to maintain a relatively large pool or body of liquor in A to act as a vehicle or a medium for the transformation or conversion of sodium carbonate material into the monohydrate.

We claim:

1. The process for the production of solid sodium carbonate monohydrate which comprises bringing together sodium carbonate and an aqueous solution, saturated with respect to monohydrate, and maintaining the temperature of said solution within the temperature range of stability of the monohydrate.

2. The process for the production of solid sodium carbonate monohydrate which comprises maintaining in an aqueous pool a condition of saturation with respect to said monohydrate, maintaining the temperature of said pool within the temperature range of stability of the monohydrate, introducing sodium carbonate into said pool and thereby causing precipitation of solid monohydrated particles within said pool, withdrawing portions of the pool liquor containing the formed insoluble solid monohydrate and separating the solid monohydrate from the mother liquor of said withdrawn portions.

3. The process for the production of solid sodium carbonate monohydrate which comprises maintaining in an aqueous pool a condition of saturation with respect to said monohydrate, maintaining the temperature of said pool above about 35° C., introducing sodium carbonate into said pool and thereby causing precipitation of solid monohydrate particles within said pool and withdrawing portions of the aqueous liquor containing the formed insoluble solid monohydrate for the recovery of the monohydrate thereof without interruption of the maintenance of the aforesaid conditions in the unwithdrawn portion of the pool.

4. The process for the continuous production of solid sodium carbonate monohydrate, which comprises maintaining an aqueous pool saturated with respect to said monohydrate, introducing sodium carbonate into said pool and thereby causing precipitation of solid monohydrate particles within said pool, withdrawing portions of the aqueous liquor containing the formed insoluble solid monohydrate, separating said solid from mother liquor of said withdrawn liquor, returning mother liquor to said aqueous pool, and maintaining the temperature of said pool throughout within the temperature range of stability of the monohydrate.

5. The process as described in claim 4, in which the impurity content and volume of the pool are controlled by withdrawing from the system a part of the mother liquor and adding an aqueous medium with a smaller impurity content than that of the withdrawn mother liquor.

In testimony whereof we have hereunto set our hands.

CARL SUNDSTROM.
GEORGE N. TERZIEV.